(12) United States Patent
Somei

(10) Patent No.: US 7,170,625 B2
(45) Date of Patent: Jan. 30, 2007

(54) PRINTER SYSTEM AND PRINTING DATA NOTIFICATION METHOD

(75) Inventor: Koji Somei, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 830 days.

(21) Appl. No.: 10/206,161

(22) Filed: Jul. 26, 2002

(65) Prior Publication Data
US 2003/0025935 A1  Feb. 6, 2003

(30) Foreign Application Priority Data
Jul. 31, 2001 (JP) ............... P. 2001-231464
Jul. 31, 2001 (JP) ............... P. 2001-231465

(51) Int. Cl.
*G06F 3/12* (2006.01)
*G06K 15/00* (2006.01)

(52) U.S. Cl. ............ 358/1.15; 358/1.14; 358/1.13
(58) Field of Classification Search ............ 358/1.15, 358/1.13, 1.14, 405, 407; 709/201, 202, 709/203
See application file for complete search history.

(56) References Cited
U.S. PATENT DOCUMENTS
2002/0044299 A1* 4/2002 Iwase et al. ............ 358/1.15

2002/0075508 A1* 6/2002 Luman ............ 358/1.15

FOREIGN PATENT DOCUMENTS
JP  09-269713  10/1997
JP  2002-077435  3/2002

* cited by examiner

*Primary Examiner*—Douglas Q. Tran
(74) *Attorney, Agent, or Firm*—Pearne & Gordon LLP

(57) ABSTRACT

A portable terminal comprises: a printing end acquisition unit for obtaining the printing end status of a printer; and a printing end confirmation unit for providing notification of the printing end for the printer by using a display device or an audible alarm. Further, a printer comprises: a printer controller, and a printer engine. The printer controller includes: a radio communication unit, for exchanging command data with a portable terminal; a printing function identification unit, for determining whether a printing function is provided for the portable terminal; a warm-up start unit, for activating a warm-up operation; and a command data processor, for interpreting the command data received from the portable terminal. The printing engine includes: an engine controller, for performing the warm-up operation based on an instruction received from the warm-up start unit; and a printing unit, for the printing of printing data that are interpreted by the command data processor. With this arrangement, when the portable terminal has moved and is within a predetermined range, the warm-up operation is started before a printing instruction is received.

9 Claims, 13 Drawing Sheets

PRINTER SYSTEM AND PRINTING DATA NOTIFICATION METHOD

BACKGROUND OF THE INVENTION

The present invention relates to a printing system including a host terminal, a printer for exchanging data with the host terminal and a portable terminal for providing radio communication with the host terminal. The present invention also relates to a printer including a printer controller having a radio communication unit for communicating with a radio communication device such as a portable terminal, and a printer engine for printing based on an instruction received from the printer controller. The present invention further pertains to a method for notifying of printing information by a printer.

Recently, attempts have been made to construct a printing system wherein, using a standard technology for a short-distance radio communication such as Bluetooth, a portable short-distance radio terminal is used to monitor an apparatus such as a printer.

FIG. 5 is a block diagram showing a conventional printing system.

In FIG. 5, the printing system comprises a host terminal 1510 and a printer 1520. The printer 1520 includes: a printer status monitoring unit 1521 for monitoring the status of the printer 1520; a printer status notification unit 1522 for transmitting to the host terminal 1510 the status of the printer 1520, which is obtained by the printer status monitoring unit 1521; and a printing unit 1523 for printing data on paper. The host terminal 1510 includes a printer status acquisition unit 1511 for obtaining the status of the printer 1520 that is to be transmitted by the printer status notification unit 1522 to the host terminal 1510; a printer status display unit 1512 for displaying the status of the printer 1520 on a display device; and a printing job processor 1513 for using document data to prepare printing data the printer 1520 can interpret and for transmitting the printing data to the printer 1520.

As is described above, the printer 1520 in FIG. 5 notifies the host terminal 1510 when the printing process has ended.

However, when an operator employs the host terminal 1510 to initiate the printing of document data and then moves away, leaving the host terminal 1510 untended, a conventional printing system can not provide confirmation that the printing process has ended, for confirming the actual printing output status can only be accomplished by using either the display device of the host terminal 1510 or the printer 1520. And especially when a large amount of document data is to be output to the printer 1520, the printing performance must actually be confirmed many times, using either the display device of the host terminal 1510 or the printer 1520. Thus, since the operator can leave neither the host terminal 1510 nor the printer 1520 untended, and his or her action is limited by time, it is difficult for that individual to perform another process in parallel.

A conventional printer will now be described while referring to FIGS. 14 and 15. FIG. 14 is a block diagram showing a conventional printer, and FIG. 15 is a block diagram showing the hardware configuration of the printer in FIG. 14.

In FIG. 14, a printer 900 comprises: a printer controller 910 for communicating with a host terminal 901; a wired communication unit 911 for exchanging command data with the host terminal 901; a command data processor 912 for interpreting command data received from the host terminal 901; a printer engine 920 for printing data based on an instruction received from the printer controller 910; an engine controller 921 for warming up the printer 900; a printing unit 922 for printing data that is interpreted by the command data processor 912; and an engine controller communication unit 930 for permitting the printer controller 910 and the printer engine 920 to exchange data.

Since in FIG. 15 a number of components, a printer 900, a host terminal 901, a printer controller 910, a printer engine 920, an engine controller 921, a printing unit 922 and an engine controller communication unit 930, are the same as those in FIG. 14, no further explanation for them will be given. However, the printer controller 910 also includes a wire communication interface 1011, which serves as a communication interface with the host terminal 901; a reception buffer memory 1012 for temporarily storing received data; a work memory RAM 1013; a CPU (Central Processing Unit) 1014; a ROM 1015, in which a control program is written; and a printing buffer memory 1016 for temporarily storing printing data.

The operation performed by the thus arranged printer 900 will now be described while referring to FIG. 15.

In FIG. 15, print command and data received from the host terminal 901 are fetched to the reception buffer memory 1012 through the wire communication interface 1011, which is a component of the printer controller 910. In accordance with an instruction from the ROM 1015, wherein the control program is written, the CPU 1014 employs the RAM 1013 as a work memory to convert, into printing data, the printing command and data fetched to the reception buffer memory 1012, and stores the printing data in the printing buffer memory 1016. Then, in accordance with an instruction from the ROM 1015, wherein the control program is written, the CPU 1014 employs the RAM 1013 as a work memory to process the printing data stored in the printing buffer memory 1016. The printing unit 922, which is a component of the printer engine 920, prints the processed printing data on a sheet of paper. In this instance, the warm-up operation for the printer 900 is not started, using the engine controller 920, until the printing command and data received from the host terminal 901 are to be printed on paper by the printing unit 922.

The warm-up operation for the conventional printer 900 is actually started when a printing instruction is output by the host terminal 901. However, since the start of the printing must be delayed until after the warm-up operation has been completed, only a limited reduction in the printing time can be realized.

A printer that uses a radio communication standard, such as Bluetooth, and includes a function for printing a document, such as an email, directly from the portable terminal is designed as an extension of the conventional printer 900. For this printer, a portable terminal and a radio communication unit are respectively employed instead of the host terminal and the wire communication unit, and the warm-up operation is not started until a printing instruction has been issued by the portable terminal. According to this method, however, since again the start of the printing must be delayed until after the warm-up operation is completed, once more only a limited reduction in the printing time can be realized.

It is therefore requested that the warm-up operation for this printer be started before a printing instruction is issued, so that the printing time, after the printing instruction has actually been issued by the portable terminal, can be reduced and is less than that in the conventional case.

SUMMARY OF THE INVENTION

It is one objective of the present invention to improve the usability of a printer by providing a new interaction function between a portable terminal and a printer.

Further, it is another objective of this invention to provide a printing system that can transmit a notification to a predetermined portable terminal at the printing end, and that, through the use of the display device of a host terminal or a printer, can reduce the number of repetitive confirmations issued for the printing that actually is output.

Furthermore, to satisfy the requests, it is an additional objective of the invention to provide a printer that starts its warm-up operation before a printing instruction is received, so that after a printing instruction is actually issued by a portable terminal, the printing time is reduced and is less than is required conventionally.

To achieve these objectives, according to first aspect of the present invention, a printing system comprising: a host terminal; a printer for exchanging data with said host terminal; and a portable terminal for performing radio communication with said host terminal, wherein said host terminal includes a specific printing information notification unit for, upon receiving specific printing information from said printer, transmitting said specific printing information to said portable terminal by radio, and wherein, upon receiving said specific printing information, said portable terminal presents a display corresponding to said specific printing information.

Preferably, a printing system comprises: a host terminal; a printer for exchanging data with the host terminal; and a portable terminal for providing radio communication with the host terminal, wherein the printer includes a printer status monitoring unit for monitoring the status of the printer, a printer status notification unit for notifying the host terminal of the status of the printer obtained by the printer status monitoring unit, and a printing unit for printing data on a sheet of paper, wherein the host terminal includes a printer status acquisition unit for obtaining the status of the printer from the printer status notification unit, a printer status display unit for displaying, on a display device, the status obtained for the printer, a printing job processor for preparing, from document data, printing data that the printer can interpret and for transmitting the printing data to the printer, a portable terminal registration unit for registering the portable terminal, and a printing end notification unit for, when the status of the printer obtained by the printer status acquisition unit indicates the printing end, transmitting a printing end notification to the portable terminal, and wherein the portable terminal includes a printing end acquisition unit for receiving the printing end notification from the printing end notification unit, and a printing end confirmation unit for outputting the printing end notification that is obtained by displaying the printing end notification on the display device, or through the release of an audible, voice, bell or music alarm produced by a tone output device.

With this configuration, a printing system can be produced that can report a printing end to a predetermined portable terminal, and that, through the use of the display device of a host terminal or a printer, can reduce the number of repetitive confirmations output for the actual printing.

According to second aspect of the invention, a printer comprises: a printer controller; and a printer engine for printing data based on an instruction received from the printer controller, wherein the printer controller includes a radio communication unit for exchanging command data with a portable terminal, a printing function identification unit for determining whether a printing function is provided for the portable terminal, a warm-up starting unit for activating a warm-up operation, and a command data processor for interpreting the command data received from the portable terminal, wherein the printing engine includes an engine controller for performing the warm-up operation based on an instruction received from the warm-up starting unit, and a printing unit for the printing of printing data that are interpreted by the command data processor, and wherein, when the portable terminal has moved and is within a predetermined range, the warm-up starting unit employs the engine controller to start the warm-up operation before a printing instruction is received.

With this configuration, since the warm-up operation is started before the printing instruction is issued, following the issue of the printing instruction by the portable terminal, the printing time can be reduced and will be less than is conventionally required.

DETAILED DESCRIPTION OF THE PREFERRED EMBODIMENTS

The preferred embodiments of the present invention will now be described while referring to FIGS. 1 to 4.

(First Embodiment)

Figure 1:
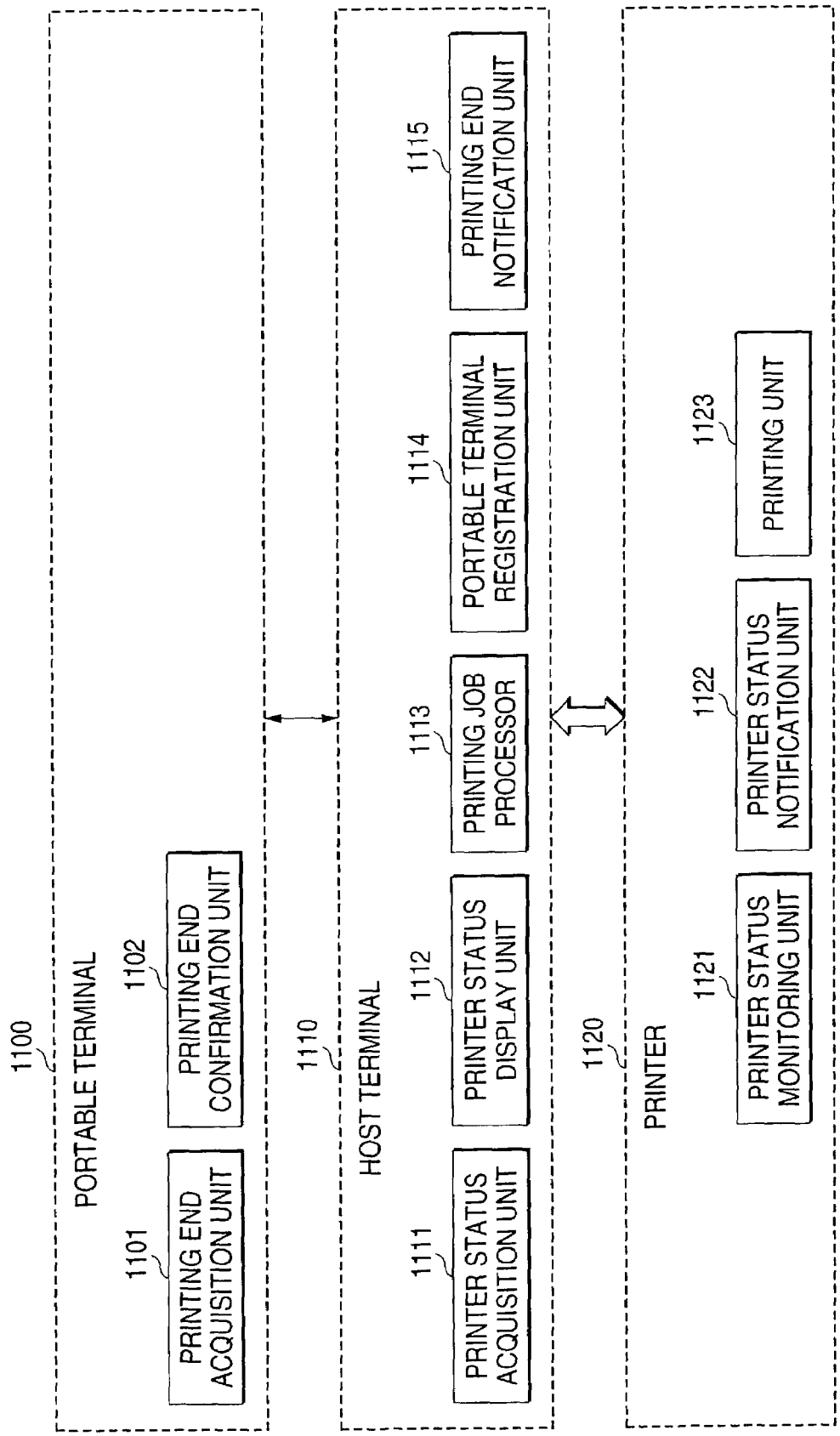
FIG. 1 is a block diagram showing a printing system according to a first embodiment of the present invention.
Figure 2:
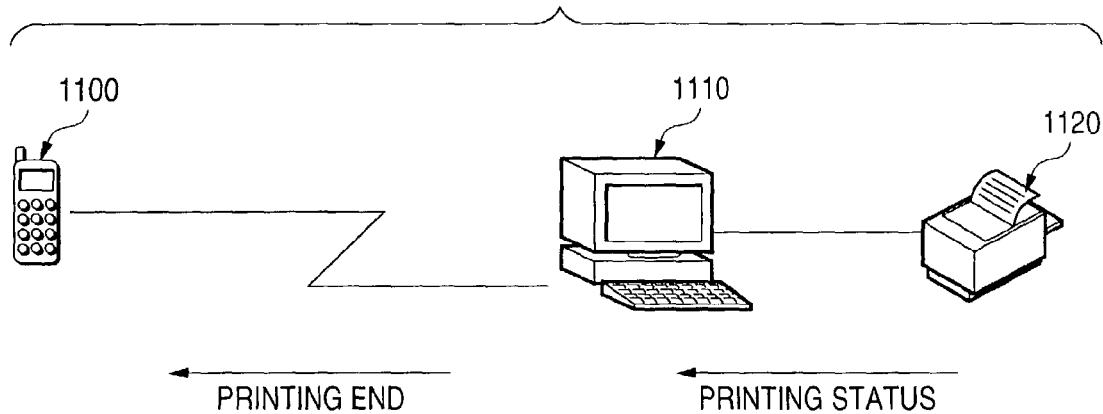
FIG. 2 is a diagram showing the positional relationship of a portable terminal, a host terminal and a printer according to the first embodiment of the invention.

FIG. 1 is a block diagram showing a printing system according to a first embodiment of the present invention, and FIG. 2 is a diagram showing the positional relationship of a portable terminal, a host terminal and a printer according to the first embodiment.

In FIGS. 1 and 2, radio transmission is employed by a portable terminal 1100 to communicate with a host terminal 1110 with which a printer 1120 exchanges data. The printer 1120 includes: a printer status monitoring unit 1121 for monitoring the status of the printer 1120; a printer status notification unit 1122 for notifying the host terminal 1110 of the status of the printer 1120 obtained by the printer status monitoring unit 1121; and a printing unit 1123 for printing data on a sheet of paper. A CPU provided in the printer 1120 serves as the printer status monitoring unit 1121 and the printing unit 1123. Also, the CPU of the printer serves as the printer status notification unit 1122 itself or in combination with a communication module. Alternatively, the printer status notification 1122 may be realized by an operating system (OS). The host terminal 1110 includes: a printer status acquisition unit 1111 for obtaining the status of the printer 1120, which the host terminal 1110 has received from the printer status notification unit 1122; a printer status display unit 1112 for displaying the status of the printer 1120 on a display device; a printing job processor 1113 for preparing printing data that can be interpreted by the printer 1120 and for transmitting the prepared printing data to the printer 1120; a portable terminal registration unit 1114 for registering a designated portable terminal (a predetermined portable terminal) 1100 for the transmission of a printing end notification to the portable terminal 1100; and a printing end notification unit 1115 for transmitting the printing end notification to the portable terminal 1100 when the status of the printer 1120 obtained by the printer status acquisition unit 1111 indicates the printing has been completed. A CPU provided in the host terminal 1110 serves as the printer status acquisition unit 1111 and the printing job processor 1113. A CRT display or a LCD display of the host terminal serves as the printer status display unit 1112. A storage such as a hard disk drive or an EEPROM memory or the like provided in the host terminal 1110 serves as the portable terminal registration unit 1114. The portable terminal 1100 further includes: a printing end acquisition unit 1101 for obtaining, from the printing end notification unit 1115, information indicating the printing end; and a printing end confirmation unit 1102 for displaying, on the display device (not shown), the printing end data obtained by the printing end acquisition unit 1101, or for releasing an audible, voice, bell or music printing end notification produced by a tone output device (not shown). A CPU of the portable terminal 1100 serves as the printing end acquisition unit 1101, and a display of the portable terminal 1100 serves as the printing end confirmation unit 1102.

Figure 3:
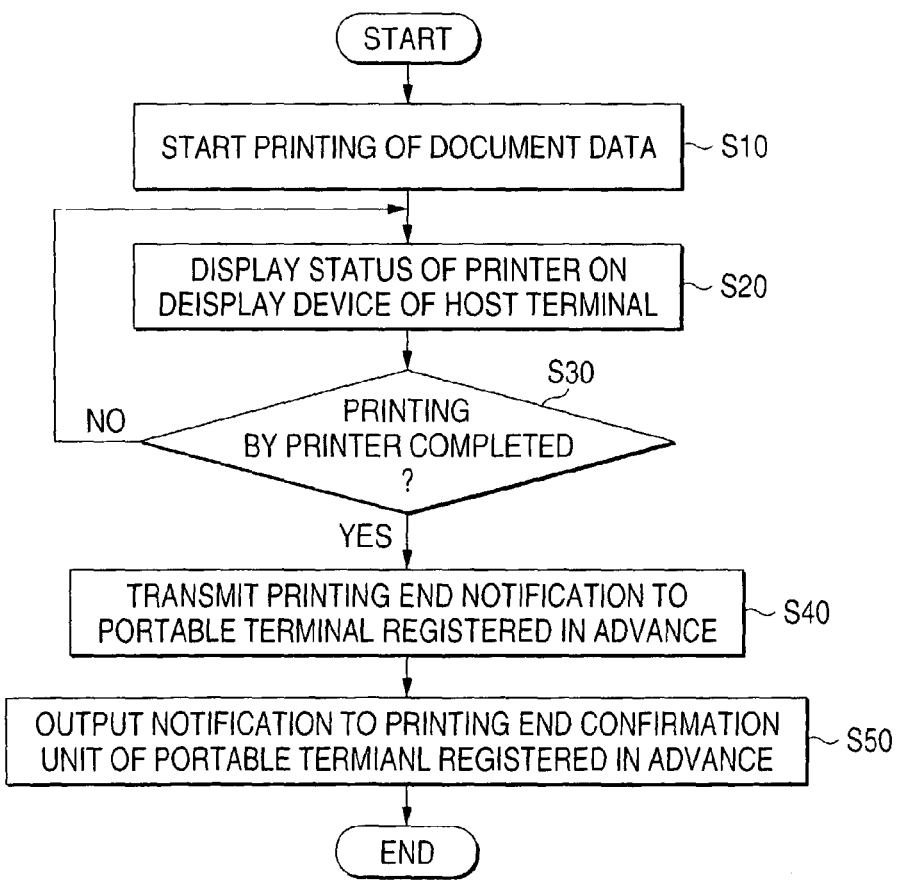
FIG. 3 is a flowchart showing the processing performed by a printing system according to first and second embodiments of the present invention.

The operation of the thus arranged printing system will now be described while referring to FIGS. 2 and 3. FIG. 3 is a flowchart showing the operation of the printing system according to the first embodiment of the invention. An explanation while referring to FIG. 2 will be given by employing the printer 1120 that is connected to the host terminal 1110 by a cable or across a network (not shown), and the portable terminal 1100 that is registered with the host terminal 1110 in advance and that employs a radio communication standard such as Bluetooth, having a short-distance radio communication range.

In FIG. 3, first, the host terminal 1110 permits the printer 1120 to start the printing of document data (S10). At step S10, the printing job processor 1113 prepares, from document data, printing data that the printer 1120 can interpret, and transmits the printing data to the printer 1120. The printer 1120 employs the printing unit 1123 to actually print, on a sheet of paper, the printing data received from the host terminal 1110. For monitoring the status of the printer 1120, the status is obtained by the printer status monitoring unit 1121 and is transmitted to the host terminal 1110 by the printer status notification unit 1122. The printer status acquisition unit 1111 obtains the status of the printer 1120, which that has been received by the host terminal 1110, and the printer status display unit 1112 displays the status of the printer 1120 on the display device of the host terminal 1110 (S20). The printer status acquisition unit 1111 then determines whether the status obtained for the printer 1120 indicates a printing end for the printer 1120 (S30). When the decision at step S30 concerning the printing end for the printer 1120 is NO, the printer status display unit 1112 displays, on the display device, the status of the printer 1120 that has newly been obtained by the printer status monitoring unit 1121 for the monitoring of the status of the printer 1120 (S20). When the decision at step S30 concerning the printing end for the printer 1120 is YES, the printing end notification unit 1115 employs a short-distance radio communication standard such as Bluetooth, to transmit a printing end notification to a portable terminal (predetermined portable terminal) 1100 that has been registered, by the portable terminal registration unit 1114, to receive a printing end notification (S40). Then, the printing end confirmation unit 1102 receives the printing end notification obtained by the printing end acquisition unit 1101 of the portable terminal 1100, and either displays, on the display device, the printing end data obtained by the printing end acquisition unit 1101, or releases an audible, voice, bell or music alarm produced by a tone output device (not shown) (S50).

As is described above, according to this embodiment, the printing end for the printer 1120 can be identified by a predetermined portable terminal 1100 (a portable terminal that has been registered with the host terminal 1110 in advance to receive a printing end notification) that is located at a distance from the host terminal 1110 or the printer 1120. Further, when direct communication is disabled between the host terminal 1110 and the portable terminal 1100, the printing end notification unit 1115 need only repeatedly transmit a notification, each time a set period of time has elapsed, for the notification to be precisely received by the predetermined portable terminal 1100. According to the first embodiment, the print end for the printer is displayed on the display of the portable terminal. However, the present invention is not limited thereto. Instead of the pint end for the printer, information of the occurrences of a paper jam, or of paper out and of an ink exhausted condition.

(Second Embodiment)

The configuration of a printing system according to a second embodiment of the invention is the same as that shown in FIG. 1.

Figure 4:
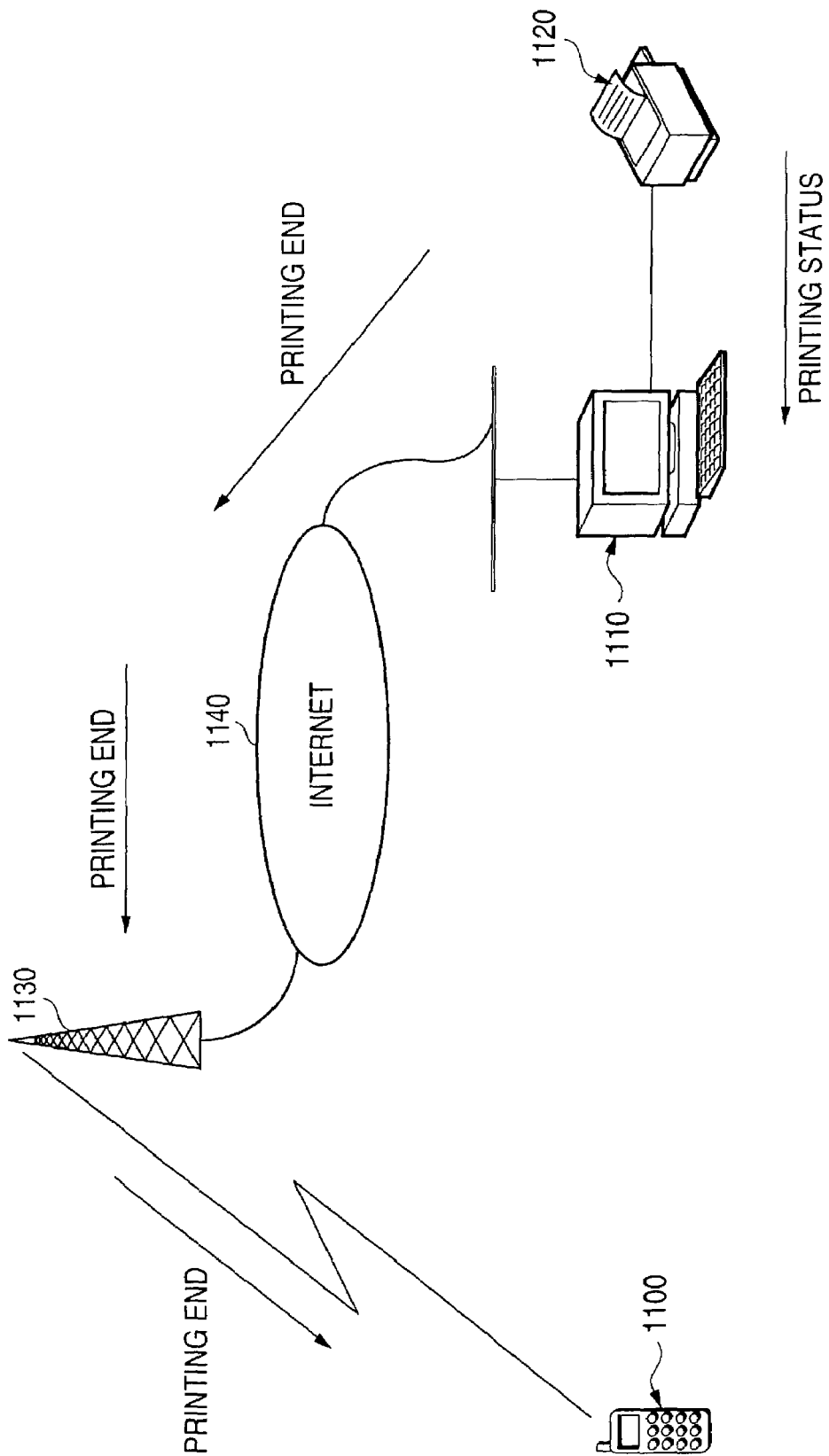
FIG. 4 is a diagram showing the positional relationship of a portable terminal, a host terminal and a printer according to the second embodiment of the invention.
Figure 5:
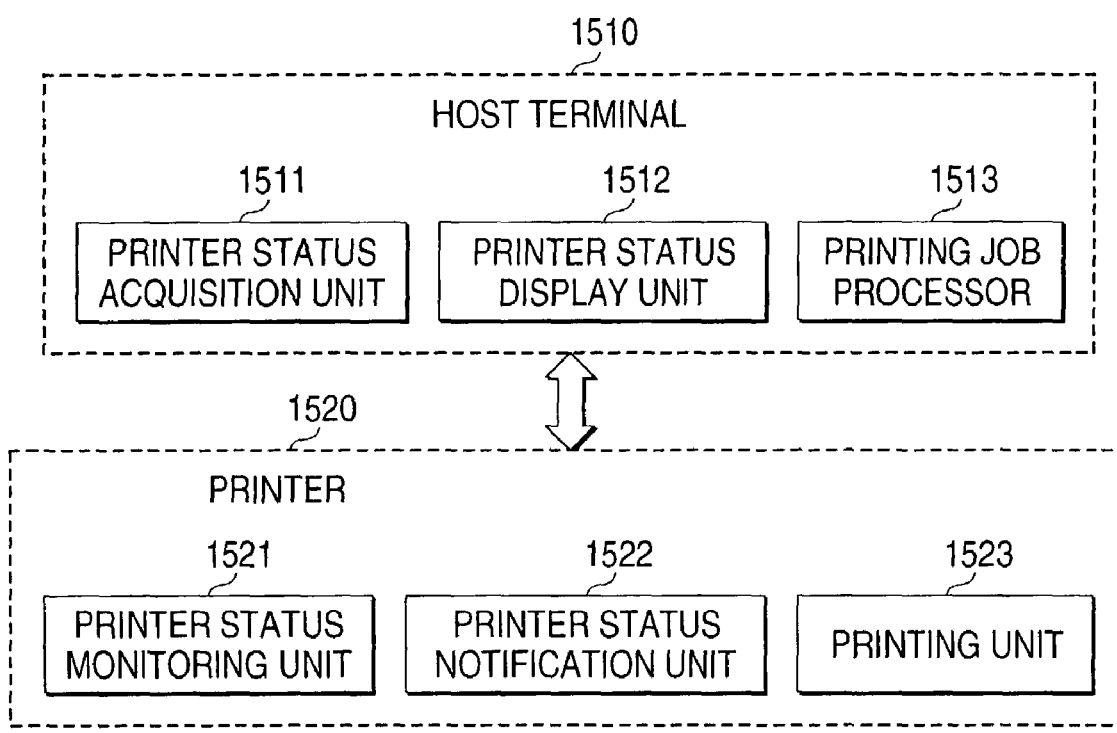
FIG. 5 is a block diagram showing a conventional printing system.

The operation of the thus arranged printing system will now be described while referring to FIGS. 3 and 4. FIG. 3 is a flowchart showing the operation of the printing system according to the second embodiment, and FIG. 4 is a diagram showing the positional relationships, according to the second embodiment, of a portable terminal, a host terminal and a printer. While referring to FIG. 4, an explanation will now be given by employing a printer 1120 that is connected to a host terminal 1110 by a cable or across a network (not shown), and a portable terminal 1100, such as a portable telephone, that is registered with the printer 1120 in advance. A base station for the portable terminal 1100 and Internet 1140 are also shown in FIG. 4.

In FIG. 3, first, the host terminal 1110 permits the printer 1120 to start printing document data (S10). At step S10, a printing job processor 1113 prepares, from the document data, printing data that the printer 1120 can interpret, and transmits the printing data to the printer 1120. The printer 1120 employs a printing unit 1123 to actually print, on a sheet of paper, the printing data received from the host terminal 1110. For monitoring the status of the printer 1120, a printer status monitoring unit 1121 obtains the status and a printer status notification unit 1122 transmits the status to the host terminal 1110. A printer status acquisition unit 1111 obtains the status of the printer 1120, received by the host terminal 1110 from the printer 1120, and a printer status display unit 1112 displays the status of the printer 1120 on the display device of the host terminal 1110 (S20). The printer status acquisition unit 1111 then determines whether the status obtained for the printer 1120 indicates a printing end for the printer 1120 (S30). When the decision at step S30 concerning the printing end for the printer 1120 is NO, a printer status display unit 1112 displays, on the display device, the status of the printer 1120 that has been newly acquired by the printer status monitoring unit 1121 while monitoring the status of the printer 1120 (S20). When the decision at step S30 concerning the printing end for the printer 1120 is YES, a printing end notification unit 1115 transmits a printing end notification across the Internet 1140 from the base station 1130 to the portable terminal (a predetermined portable terminal) 1100 that, to receive a printing end notification (S40), has been registered with a portable terminal registration unit 1114 in advance. A printing end confirmation unit 1102 receives the printing end notification obtained by the printing end acquisition unit 1101 of the portable terminal 1100, and displays this printing end notification on the display device, or releases an audible, voice, bell or music alarm produced by a tone output device (not shown) (S50).

As is described above, according to this embodiment, the printing end of the printer 1120 can be confirmed by a predetermined portable terminal (a portable terminal registered with the host terminal 1110 in advance to receive the printing end notification) 1100 that is located at a distance from the host terminal 1110 or the printer 1120. Further, since the Internet 1140 is employed for communication between the host terminal 1110 and the portable terminal 1100, the printing end can be identified through the Internet 1140, even when direct communication is disabled between the host terminal 1110 and the portable terminal 1100 registered with the host terminal 1110. Therefore, the printing end of the printer 1120 can be identified even by a portable terminal 1100 at a remote location. In addition, when direct communication is disabled between the host terminal 1110 and the portable terminal 1100, the printing end notification unit 1115 need only repeatedly transmit the notification, each time a set period of time has elapsed, for the notification to be precisely received by the predetermined portable terminal 1100.

As is described above, the printing system comprises: a host terminal; a printer for exchanging data with the host terminal; and a portable terminal for providing radio communication with the host terminal, wherein the printer includes a printer status monitoring unit for monitoring the status of the printer, a printer status notification unit for notifying the host terminal of the status of the printer obtained by the printer status monitoring unit, and a printing unit for printing data on a sheet of paper, wherein the host terminal includes a printer status acquisition unit for obtaining the status of the printer from the printer status notification unit, a printer status display unit for displaying, on a display device, the status obtained for the printer, a printing job processor for preparing, from document data, printing data that the printer can interpret and for transmitting the printing data to the printer, a portable terminal registration unit for registering the portable terminal, and a printing end notification unit for, when the status of the printer obtained by the printer status acquisition unit indicates the printing end, transmitting a printing end notification to the portable terminal, and wherein the portable terminal includes a printing end acquisition unit for receiving the printing end notification from the printing end notification unit, and a printing end confirmation unit for outputting the printing end notification that is obtained by displaying the printing end notification on the display device, or through the release of an audible, voice, bell or music alarm produced by a tone output device. With this configuration, since for the printer the printing end can be reported to a portable terminal registered at the host terminal, and since the notification of the printing end can thus be provided for an operator who is not present at the host terminal or the printer, the number of repetitive printing end confirmations that are output, using the display device of the host terminal or the printer, can be reduced.

Further, according to the printing system of the invention, the Internet is employed for communications between the host terminal and the portable terminal. With this arrangement, even when the host terminal and the portable terminal registered at the host terminal can not communicate directly, the Internet can be used to transmit the printing end confirmation. Therefore, by using the portable terminal, the printing end can be reliably identified at a remote location.

Furthermore, according to the printing system of the invention, when communication between the host terminal and the portable terminal is disabled, the printing end notification can be repeatedly retransmitted by the printing end notification unit upon the elapse of a set period of time.

With this arrangement, the notification can be reliably transmitted to a predetermined portable terminal.

The other preferred embodiments of the invention will now be described while referring to FIGS. 6 to 13.

(Third Embodiment)

Figure 6:
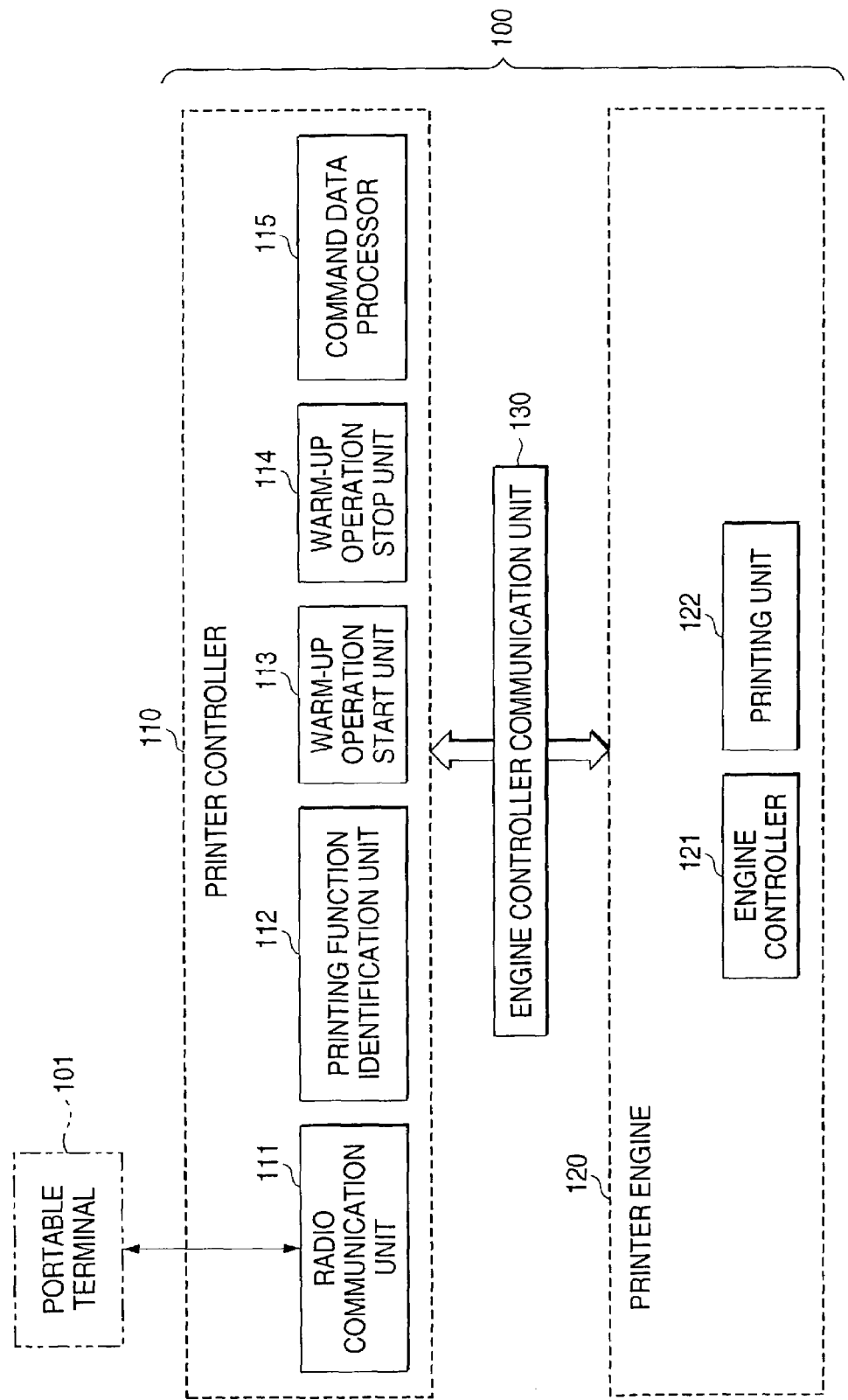
FIG. 6 is a block diagram showing a printer according to a third embodiment of the invention.
Figure 7:
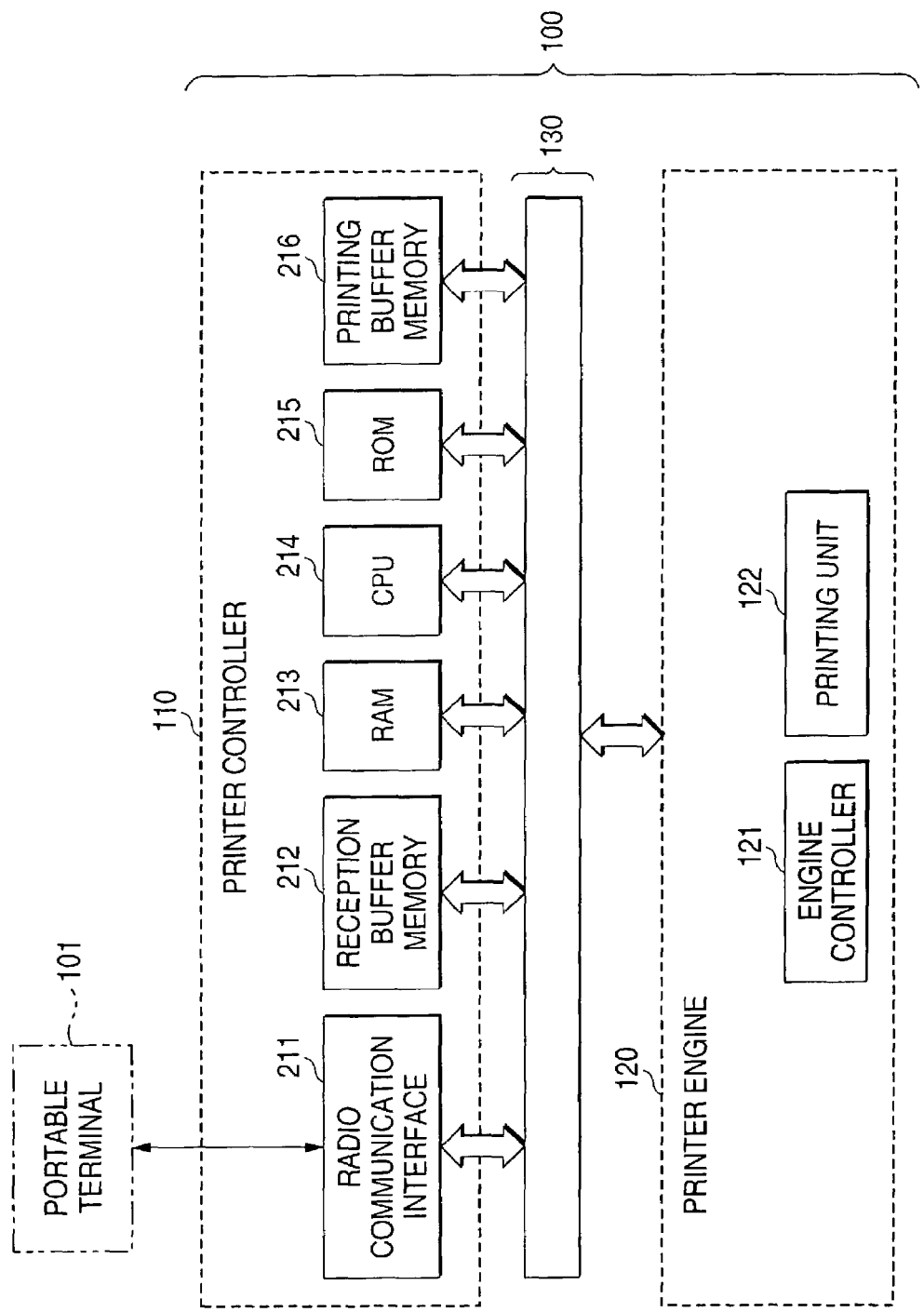
FIG. 7 is a block diagram showing the hardware configuration of the printer in FIG. 6.

FIG. 6 is a block diagram showing a printer according to a third embodiment of the present invention, and FIG. 7 is a block diagram showing the hardware configuration of the printer in FIG. 6.

In FIG. 6, a printer 100 comprises: a printer controller 110; a radio communication unit 111 for exchanging command data with a portable terminal (a portable radio terminal) 101 that performs the radio communication function; a printing function identification unit 112 for determining whether the portable terminal 101 includes a printing function for the printer 100; a warm-up start unit 113 for activating the warm-up operation of the printer 100; a warm-up stop unit 114 for halting the warm-up operation of the printer 100; a command data processor 115 for interpreting command data received from the portable terminal 101; a printer engine 120; an engine controller 121 for performing the warm-up operation for the printer 100; a printing unit 122 for printing the printing data that are interpreted by the command data processor 115; and an engine controller communication unit 130 for permitting the printer controller 110 and the printer engine 120 to exchange data.

In FIG. 7, the printer 100, the portable terminal 101, the printer controller 110, the printer engine 120, the engine controller 121, the printing unit 122 and the engine controller communication unit 130 are the same as those in FIG. 6 and no further explanation for them will be given. The printer controller 110 includes: a radio communication interface 211, which is a communication interface for the portable terminal 101; a reception buffer memory 212, which is used to temporarily store received data; a RAM 213, which serves as a work memory; a CPU (Central Processing Unit) 214; a ROM 215, in which a control program is stored; and a printing buffer memory 216, which is used to temporarily store printing data.

When the portable terminal 101 and the printer 100 are located within radio communication range, printing command and data from the portable terminal 101 is fetched to the reception buffer memory 212 through the radio communication interface 211, which is a component of the printer controller 110. In accordance with an instruction from the ROM 215, in which the control program is stored, the CPU 214 employs the RAM 213 as a work memory to convert, into printing data, the printing command and data fetched to the reception buffer memory 212, and stores the printing data in the printing buffer memory 216. Then, in accordance with an instruction from the ROM 215, in which the control program is stored, the CPU 214 employs the RAM 213 as a work memory for the processing of the printing data stored in the printing buffer memory 216, and the printing unit 122, which is a component of the printer engine 120, prints the obtained printing data on a sheet of paper.

Figure 8:
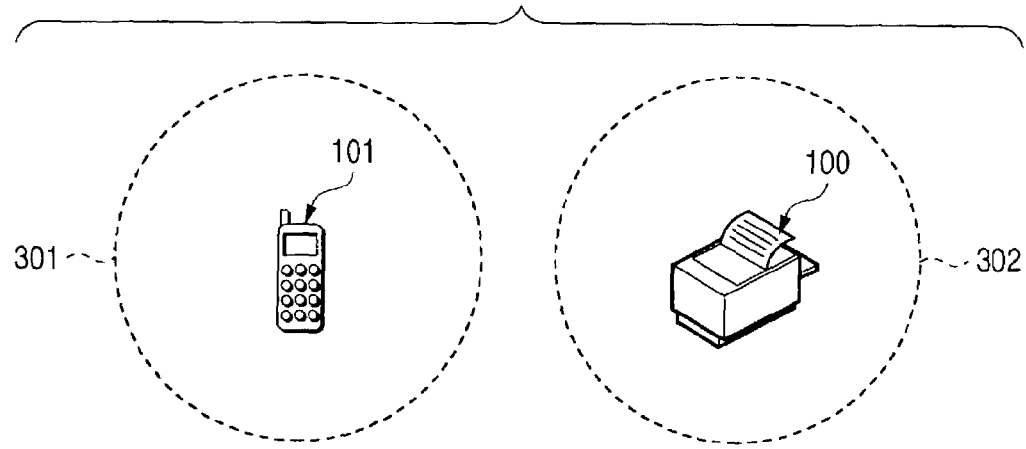
FIGS. 8A to 8C are diagrams showing the relationships of the portable terminal and the printer.
Figure 8:
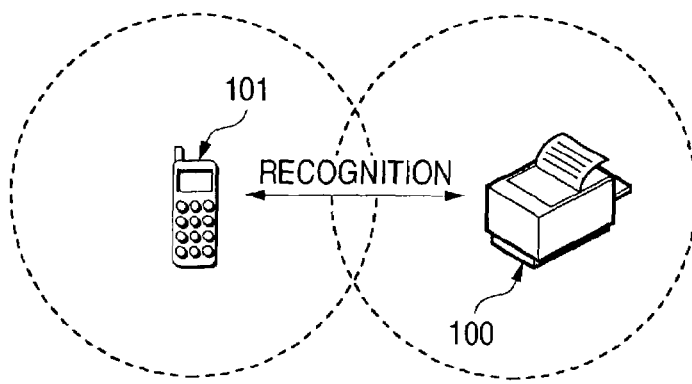
Figure 8:
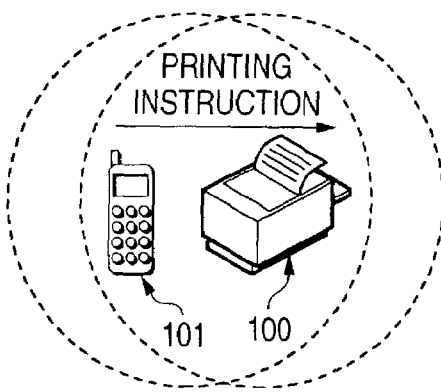
Figure 9:
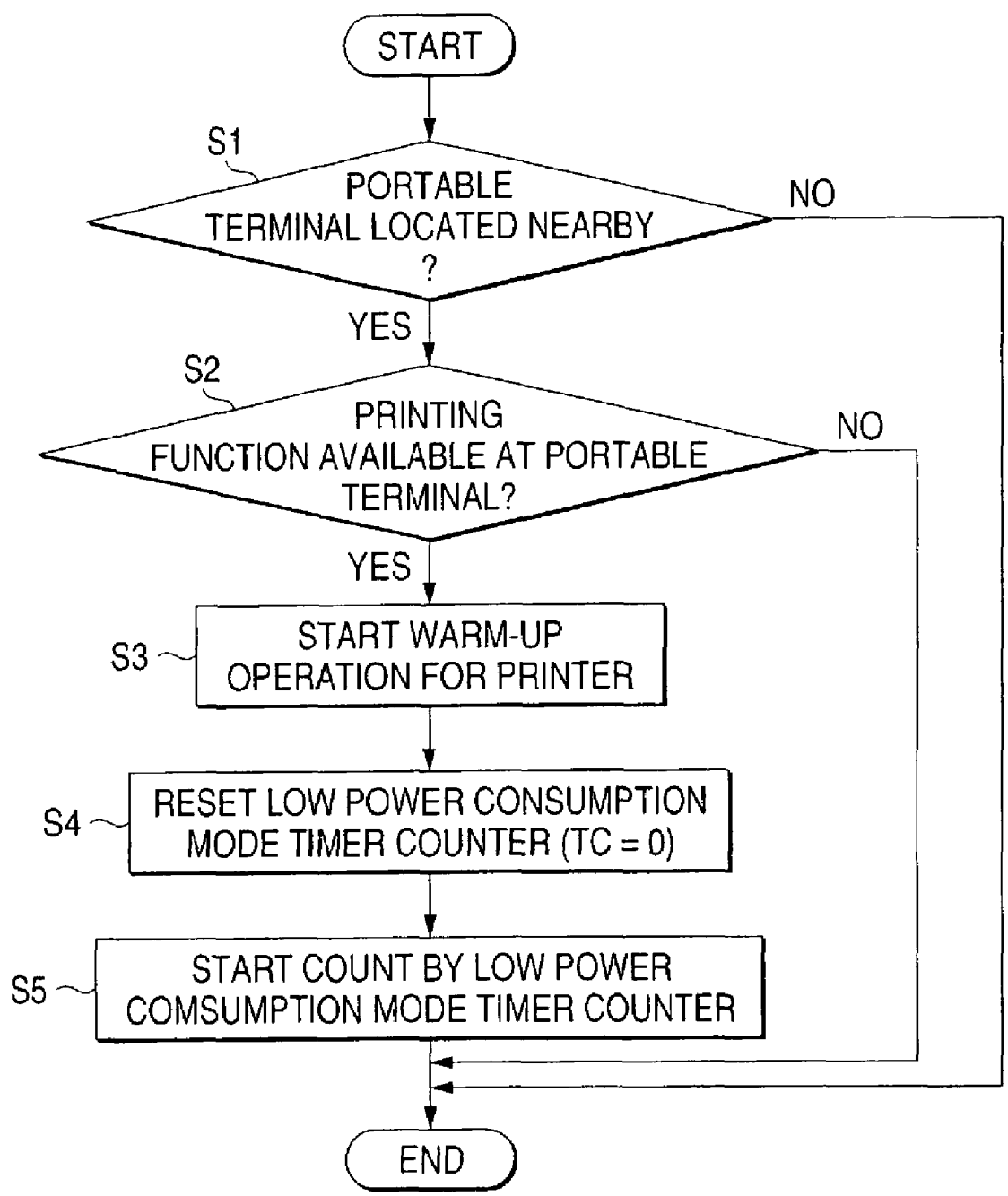
FIG. 9 is a flowchart showing the operation of the printer for a first monitoring task.
Figure 10:
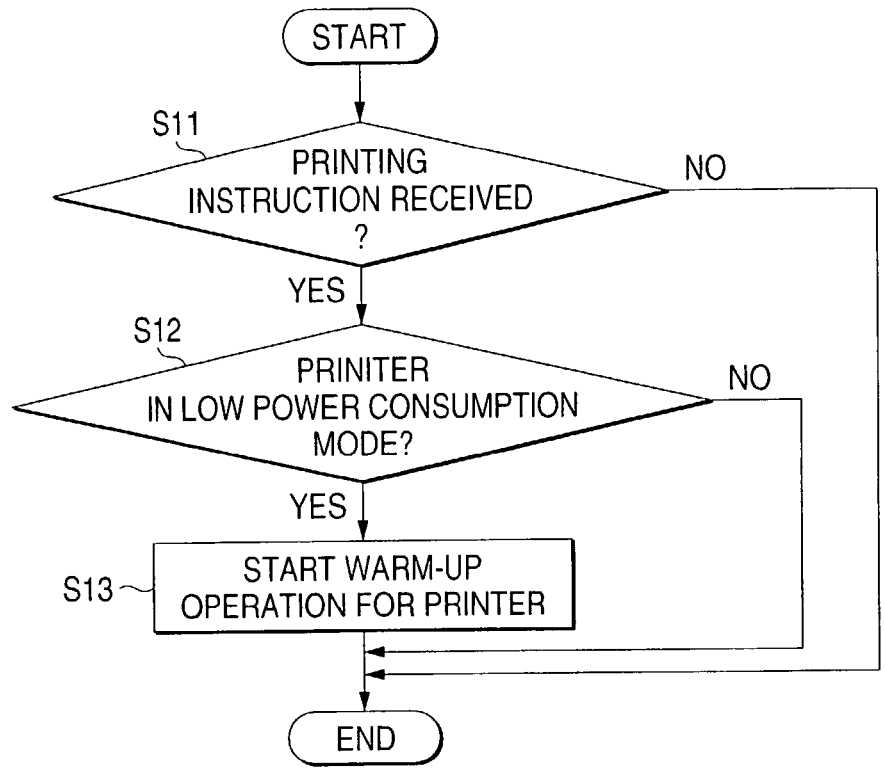
FIG. 10 is a flowchart showing the operation of the printer for a second monitoring task.
Figure 11:
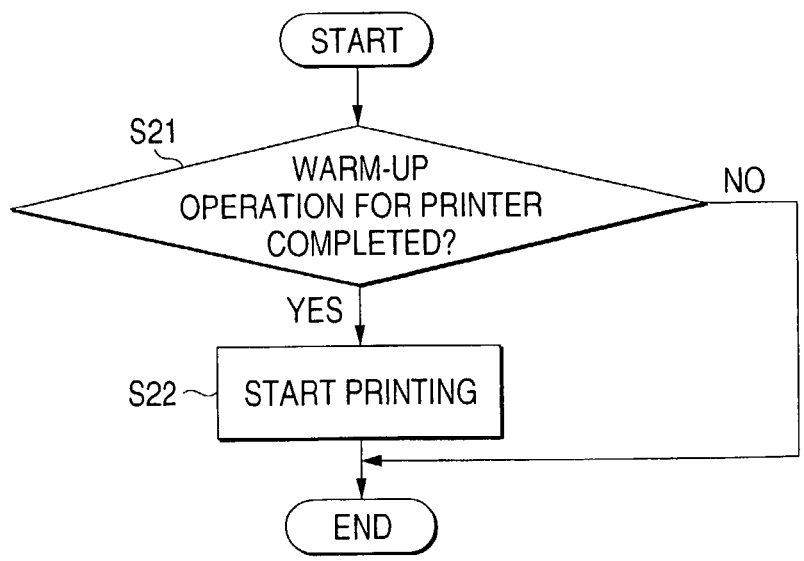
FIG. 11 is a flowchart showing the operation of the printer for a third monitoring task.
Figure 12:
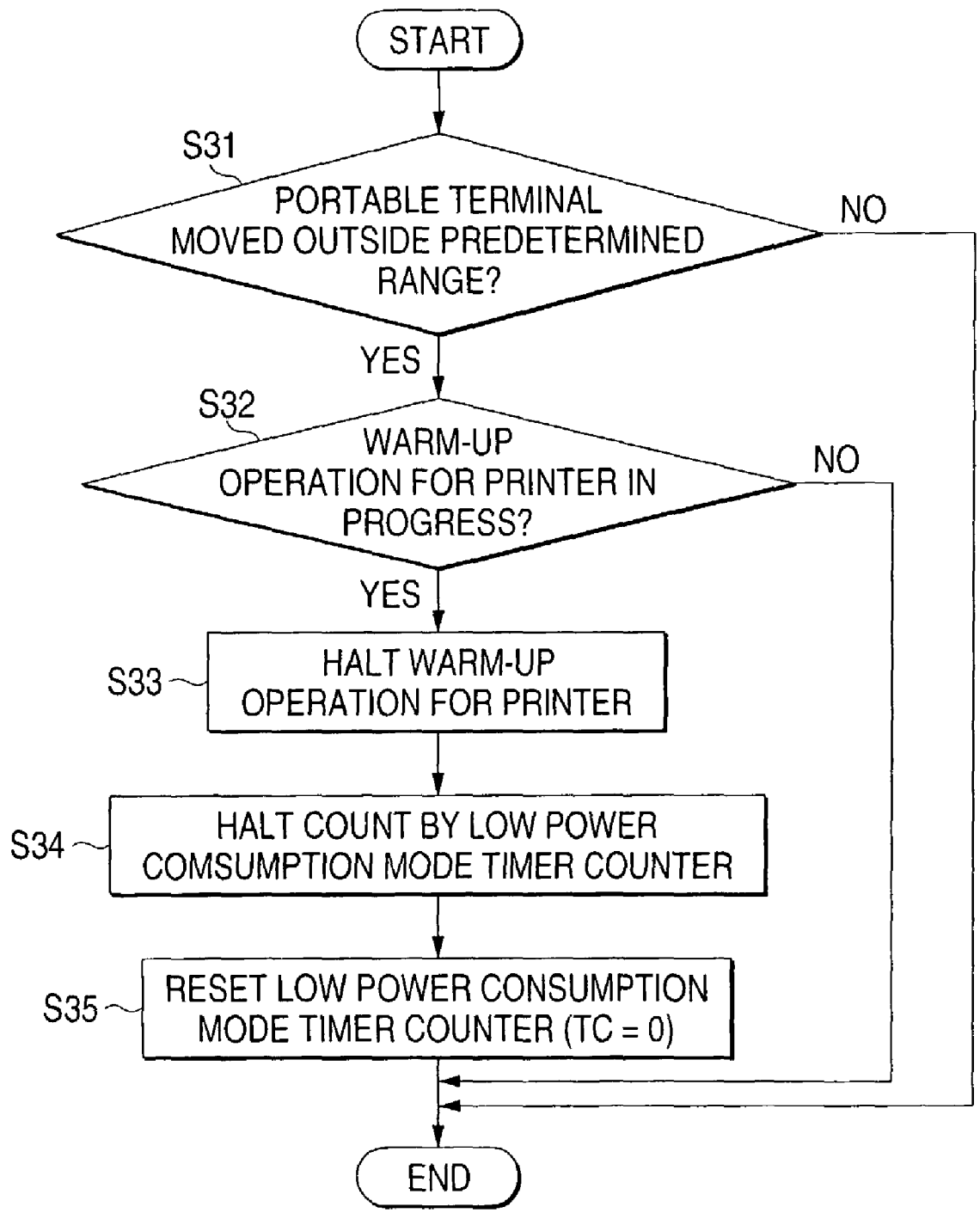
FIG. 12 is a flowchart showing the operation of the printer for a fourth monitoring task.
Figure 13:
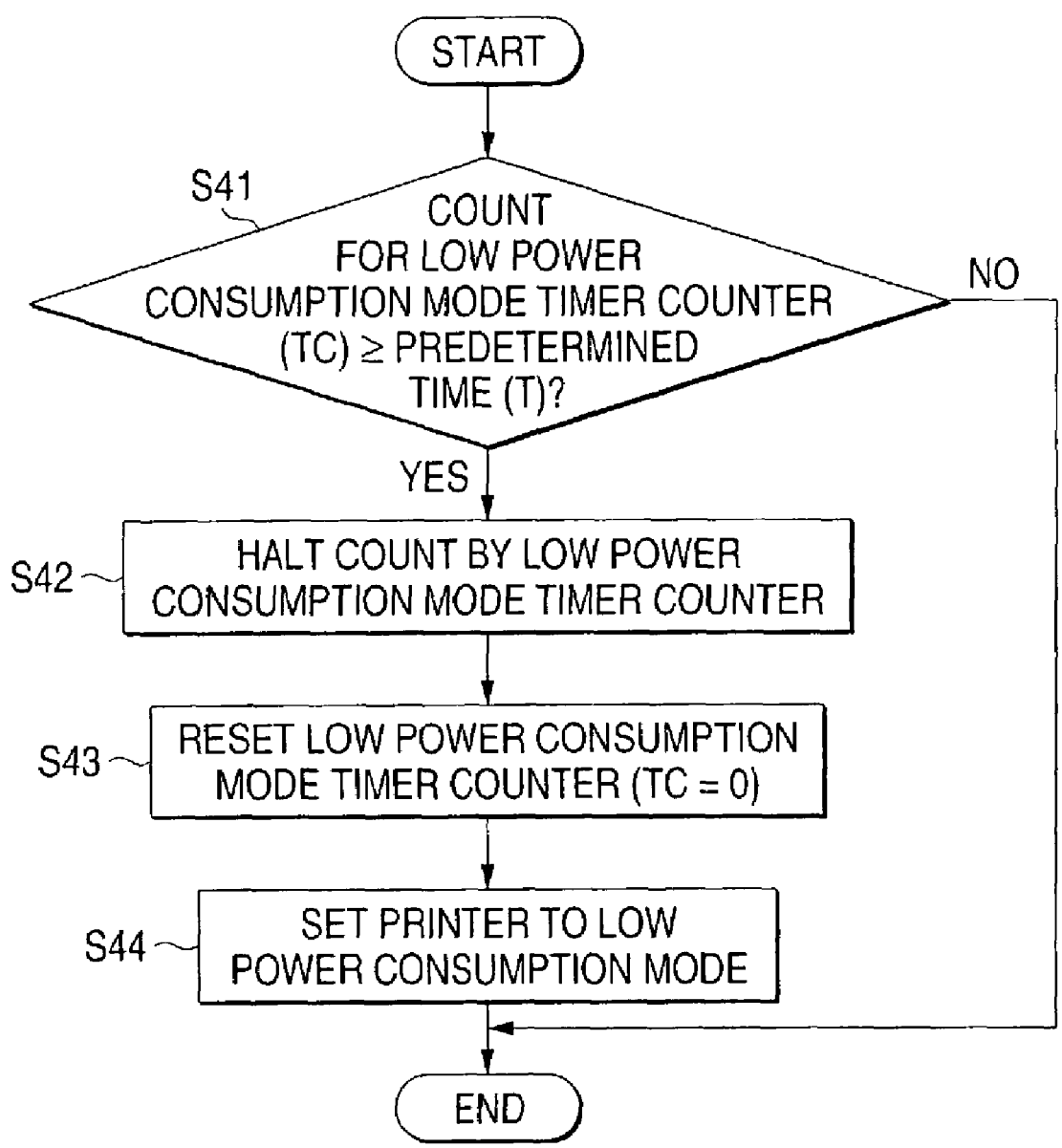
FIG. 13 is a flowchart showing the operation of the printer for a fifth monitoring task.
Figure 14:
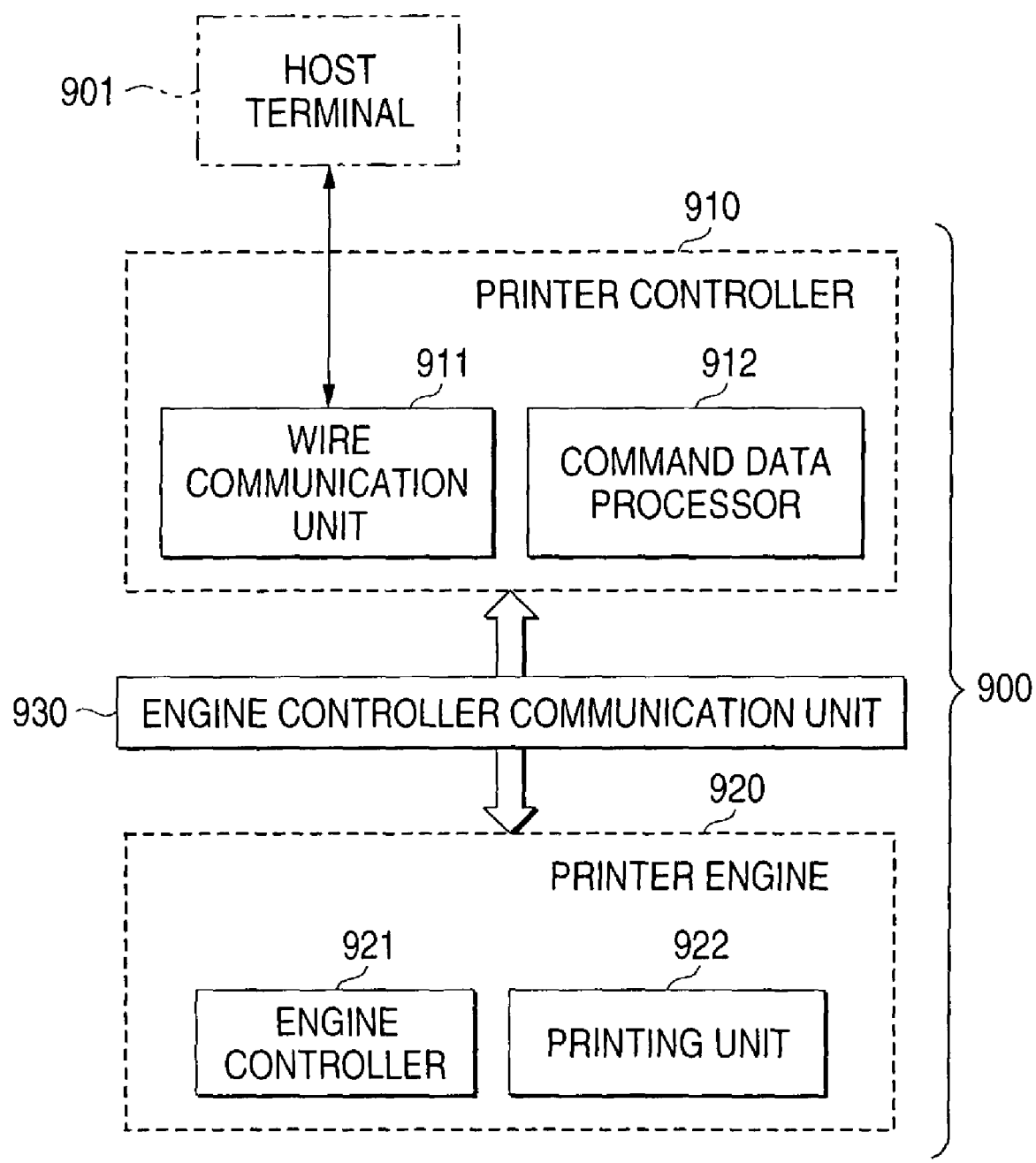
FIG. 14 is a block diagram showing a conventional printer that does not employ a radio communication standard such as Bluetooth.
Figure 15:
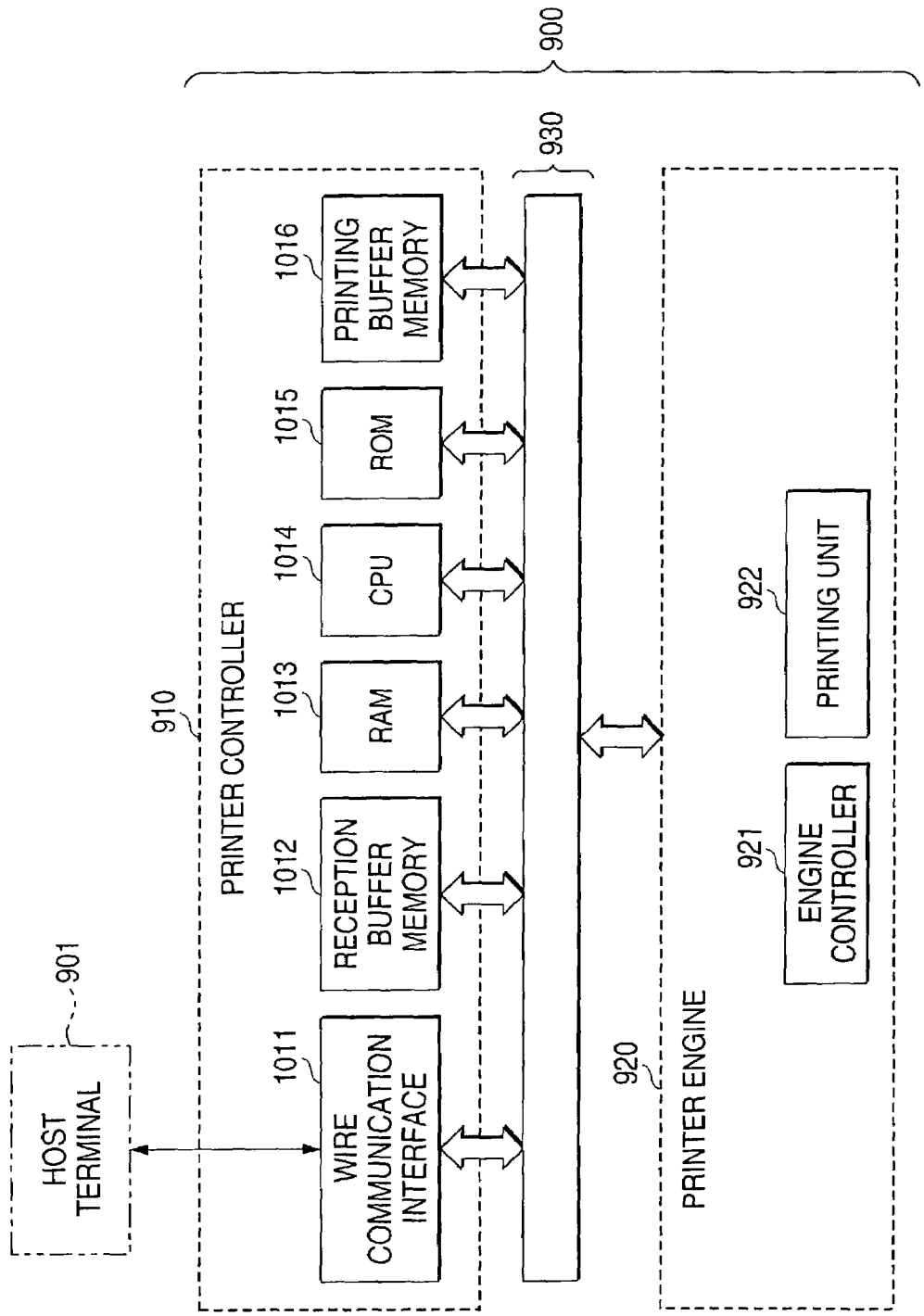
FIG. 15 is a block diagram showing the hardware configuration of the printer in FIG. 14.

The operation of the thus arranged printer 100 will now be described while referring to FIGS. 8 to 13. FIGS. 8A to 8C are diagrams showing the positional relationships of the portable terminal 101 and the printer 100. FIG. 9 is a flowchart showing the operations performed as a first monitoring task for the printer 100; FIG. 10 is a flowchart showing the operations performed as a second monitoring task for the printer 100; FIG. 11 is a flowchart showing the operations performed as a third monitoring task for the printer 100; FIG. 12 is a flowchart showing the operations performed as a fourth monitoring task for the printer 100; and FIG. 13 is a flowchart showing the operations performed as a fifth monitoring task for the printer 100.

An explanation while referring to FIGS. 8A to 8C will now be given by employing an example wherein the portable terminal 101, which is a radio communication terminal having a communication range 301, approaches the printer 100, which is a radio printer having a communication range 302. For the example shown in FIG. 8A, a decision as to whether the portable terminal 101 is located nearby is NO (S1), and the first monitoring task is temporarily terminated. This determination is performed by the radio communication unit 111. For the example in FIG. 8B, wherein the portable terminal 101 further approaches the printer 100, the decision for the location of the portable terminal 101 is YES (S1), and the printing function identification unit 112 determines whether the printing function is available at the portable terminal 101 (S2). For the example in FIG. 8B, the portable terminal 101 and the printer 100 identify each other. When at step S2 the decision by the printing function identification unit 112 is YES, the warm-up start unit 113 starts the warm-up operation for the printer 100 (S3). Then, the warm-up start unit 113 resets (TC=0) a low power consumption mode timer counter (not shown), which is a counter used to determine the time at which to shift to a low power consumption mode (S4), and starts the count by the low power consumption mode timer counter (S5). Thereafter, the first monitoring task in FIG. 9 is terminated. When an instruction is received from the warm-up start unit 113 of the printer controller 110, the engine controller 121, which is a component of the printer engine 120, employs the engine controller communication unit 130 to start the warm-up operation (S3).

In the example in FIG. 8C, wherein the portable terminal 101 and the printer 100 are located in an area wherein their communication ranges 301 and 302 overlap, when a printing instruction, such as an email printing instruction, is issued by the portable terminal 101 to the printer 100, the radio communication unit 111 provides YES as the decision arrived at for the reception of the printing instruction for the second monitoring task in FIG. 10 (S11). Further, when the warm-up start unit 113 provides NO as the decision for a switch to the low power consumption mode (S12), the warm-up operation for the printer 100 has already been completed. Thus, the decision YES is obtained for the completion of the warm-up operation for the printer 100 in the third monitoring task in FIG. 11 to which program control is to be shifted (S21), and the printing performed by the printer 100 is started immediately (S22). At this time, the printing unit 122, which is a component of the printer engine 120, is employed to start printing (S22). When the warm-up start unit 113 provides a YES decision at S12, the warm-up operation for the printer 100 has been started (S13), and program control is shifted to the process in FIG. 11.

For the example in FIG. 8A, wherein the portable terminal 101, which has the communication range 301, moves outside a predetermined range from the printer 100, which has the communication range 302, for the fourth monitoring task in FIG. 12, the decision as to whether the portable terminal 101 has moved outside the predetermined range is YES (S31). When the decision YES, concerning whether the warm-up operation for the printer 100 is being performed, is obtained by the warm-up start unit 113 (S32), the warm-up stop unit 114 halts the warm-up operation for the printer 100 (S33) and also halts the count by the low power consumption mode timer counter, which is used to determine the time at which to shift to the low power consumption mode (S34). Further, the warm-up stop unit 114 resets (TC=0) the low power consumption mode timer counter (S35), and thereafter, the fourth monitoring task is terminated.

For the fifth monitoring task in FIG. 13, when the warm-up start unit 113 obtains YES as the decision concerning whether the low power consumption mode timer counter value TC≧predetermined time T (S41), i.e., when the portable terminal 101 has moved away from the printer 100 into the predetermined range, and when the radio communication unit 111 ascertains that the warm-up operation for the printer 100 has been started and the portable terminal 101 has not issued a printing instruction for a predetermined time (a predetermined time has elapsed since the warm-up operation was started), or when the radio communication unit 111 ascertains that a printing instruction has not been issued by the portable terminal 101 for a predetermined time since the previous printing process was completed, the warm-up stop unit 114 halts the count by the low power consumption mode timer counter, which is used to determine the time at which to shift to the low power consumption mode (S42). Further, the warm-up stop unit 114 resets (TC=0) the low power consumption mode timer counter (S43), and sets the printer 100 to the low power consumption mode (S44). The fifth monitoring task is thereafter terminated. And at this time, at step S44, the engine controller 121, which is a component of the printer engine 120, is employed to set the printer 100 to the low power consumption mode.

In this embodiment, the radio communication terminal 101 is employed as a portable terminal. However, the present invention is not limited to this configuration; the same effects can be obtained by using a portable infrared terminal as the portable terminal 101 and using an infrared communication unit as the radio communication unit 111.

As is described above, according to this embodiment, when the radio communication unit 101 approaches the printer 100 and the printing function identification unit 112 determines that the printing function is available at the radio communication terminal 101, the warm-up start unit 113 employs the engine controller 121 to start the warm-up operation for the printer 100 in advance. Therefore, when a printing instruction is actually issued by the portable radio terminal 101, a warm-up operation for the printer 100 will not be necessary and the printing time, for the printing unit, will be reduced and will be less than that required conventionally.

Further, the warm-up stop unit 114 for halting the warm-up operation is also included, so that when the portable terminal 100 moves outside the predetermined range while the engine controller 121 is currently performing the warm-up operation, the warm-up stop unit 114 will halt the warm-up operation. Therefore, since the warm-up operation can be halted when the portable terminal 101 has moved outside the predetermined range, i.e., when the warm-up operation is not required, the energy consumed by the printer 100 can be reduced.

In addition, when the portable terminal 101 has not issued a printing instruction for a predetermined period of time following the movement of the portable terminal 101 into the predetermined range and the engine controller 121 has begun the warm-up operation, or when the portable terminal 101 has not issued a printing instruction for a predetermined period of time since the previous printing process was completed, the warm-up stop unit 114 sets the low power consumption mode. Therefore, under a condition wherein the warm-up operation is not required, such as when no printing instruction has been issued for a predetermined period of time, the low power consumption mode can be set even when the portable terminal 101 is outside the predetermined range. As a result, the energy consumed by the printer can be reduced.

Furthermore, the infrared communication unit and the infrared communication terminal that employ a radio communication standard such as IrDA, may be employed instead of the radio communication unit 111 and the portable terminal 101. Thus, when the infrared portable terminal has moved inside the predetermined range, by using the engine controller 121, the warm-up start unit 113 can start the warm-up operation for the printer 100 in advance. Therefore, when a printing instruction is actually issued by the infrared portable terminal, a warm-up operation need not be performed for the printer 100, and the printing time required by the printing unit 122 can be reduced.

As is described above, the printer of the invention comprises: a printer controller; and a printer engine for printing data based on an instruction received from the printer controller, wherein the printer controller includes a radio communication unit for exchanging command data with a portable terminal, a printing function identification unit for determining whether a printing function is provided for the portable terminal, a warm-up start unit for activating a warm-up operation, and a command data processor for interpreting the command data received from the portable terminal, wherein the printing engine includes an engine controller for performing the warm-up operation based on an instruction received from the warm-up start unit, and a printing unit for the printing of printing data that are interpreted by the command data processor, and wherein, when the portable terminal has moved and is within a predetermined range, the warm-up start unit employs the engine controller to start the warm-up operation before a printing instruction is received.

With this configuration, since the warm-up operation need not be performed when the printing instruction is actually issued by the portable terminal, following the issue of the printing instruction by the portable terminal, the printing time can be reduced and will be less than is conventionally required.

Further, the printer of the invention further comprises: a warm-up stop unit for halting the warm-up operation, wherein, when the portable terminal has moved outside the predetermined range, the engine controller halts the warm-up operation that is currently being performed. With this arrangement, when the portable terminal has moved outside the predetermined range, i.e., when the warm-up operation is not required, this operation can be halted. Thus, the energy consumed by the printer can be reduced.

Furthermore, according to the printer of this invention, when a printing instruction has not been issued by the portable terminal for a predetermined period of time following the movement of the portable terminal to a location within the predetermined range and the starting by the engine controller of the warm-up operation, or when a printing instruction has not been issued by the portable terminal following the completion of a job, a low power consumption mode is set by the warm-up stop unit. With this arrangement, when the operating condition is one for which a warm-up operation is not required, such as when a printing instruction has not been issued for a predetermined period of time, the low power consumption mode can be set even when the portable terminal is located within the predetermined range. Therefore, the energy consumed by the printer can be reduced.

In addition, the printer further comprises: an infrared communication unit and an infrared communication terminal, which employ a radio communication standard such as IrDA, instead of the radio communication unit and the portable terminal. With this arrangement, when the infrared portable terminal has moved and is within the predetermined range, the warm-up start unit employs the engine controller to start the warm-up operation for the printer. Therefore, the printer warm-up operation need not be performed again when the printing instruction is actually issued by the infrared portable terminal, and the printing time required by the printing unit can be reduced.

What is claimed is:

1. A printing system comprising:
   a host terminal for transmitting printer data;
   a printer for exchanging data with said host terminal; and
   a portable terminal for performing radio communication with said host terminal,
   wherein said host terminal includes a specific printing information notification unit for, upon receiving specific printing information from said printer, transmitting said specific printing information to said portable terminal by radio, and
   wherein, upon receiving said specific printing information, said portable terminal presents a display corresponding to said specific printing information.

2. A printing system according to claim 1, wherein said specific printing information includes data for at least one of the occurrences of a printing end for said printer, of paper out, of a paper jam, and of an ink exhausted condition.

3. A printing system according to claim 2, wherein said display includes at least one of a visual display, an audible alarm and a vibration alarm.

4. A printing system comprising:

a host terminal;

a printer for exchanging data with said host terminal; and a portable terminal for performing radio communication with said host terminal, wherein said host terminal includes a specific printing information notification unit for, upon receiving specific printing information from said printer, transmitting said specific printing information to said portable terminal by radio, and wherein, upon receiving said specific printing information, said portable terminal presents a display corresponding to said specific printing information wherein said printer includes:

a printer status monitoring unit for monitoring the status of said printer, a printer status notification unit for notifying said host terminal of said status of said printer obtained by said printer status monitoring unit, and a printing unit for printing data on a sheet of paper;

wherein said host terminal includes:

a printer status acquisition unit for obtaining said status of said printer from said printer status notification unit, a printer status display unit for displaying, on a display device, said status obtained for said printer, a printing job processor for preparing, from document data, printing data that said printer can interpret and for transmitting said printing data to said printer, a portable terminal registration unit for registering said portable terminal, and a printing end notification unit for, when said status of said printer obtained by said printer status acquisition unit indicates the printing end, transmitting a printing end notification to said portable terminal; and wherein said portable terminal includes:

a printing end acquisition unit for receiving said printing end notification from said printing end notification unit, and a printing end confirmation unit for outputting said printing end notification that is obtained by displaying said printing end notification on said display device, or through the release of an audible, voice, bell or music alarm produced by a tone output device.

5. A printing system according to claim 4, wherein the Internet is employed for communications between said host terminal and said portable terminal.

6. A printing system according to claim 5, wherein, when direct communication between said host terminal and said portable terminal is disabled, said printing end notification is repeatedly retransmitted by said printing end notification unit upon the elapse of a set period of time.

7. A printing data notification method comprising the steps of:

transmitting specific printing information from a printer to a host terminal, said host terminal transmits printer data to the printer and exchanges data with the printer;

transmitting said specific printing information from said host terminal to said portable terminal by radio; and executing a notification corresponding to said specific printing information from said portable terminal upon receiving said specific printing information.

8. A printing data notification method according to claim 7, wherein said specific printing information includes data for at least one of the occurrences of a printing end for said printer, out of paper, a paper jam, and an ink exhausted condition.

9. A printing data notification method according to claim 8, wherein said display includes at least one of a visual display, an audible alarm and a vibration alarm.

* * * * *